United States Patent Office 3,336,419
Patented Aug. 15, 1967

3,336,419
PHOSPHOROTHIOIC AMIDES AND IMIDES
Henry Tolkmith, Midland, Mich., assignor to The Dow Chemical Company, Midland, Mich., a corporation of Delaware
No Drawing. Filed Jan. 10, 1964, Ser. No. 336,894
6 Claims. (Cl. 260—926)

ABSTRACT OF THE DISCLOSURE

The present invention is concerned with the reaction of phosphoramides with carboxylic acid halides to prepare mixed compounds, especially those of the formulae

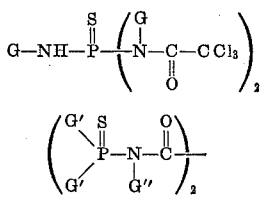

and

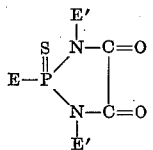

In these formulae, each moiety represented by G is, in a given compound, the same loweralkyl radical; each moiety represented by G' is independently selected from the group consisting of loweralkoxy, phenoxy, and phenyl; each moiety represented by G" is independently selected from the group consisting of hydrogen and loweralkyl; E represents a member selected from the group consisting of loweralkyl, phenyl, loweralkoxy, phenoxy, monoloweralkylamino, diloweralkylamino, monoloweralkenylamino, and N-loweralkyl-2,2,2-trihaloacetamido; and each moiety represented by E' is independently selected from the group consisting of loweralkyl and loweralkenyl. These compounds are useful as parasiticides and herbicides.

---

The present invention is directed to a novel method for the preparation of mixed imide compounds and to novel mixed imide compounds prepared by the noval method.

The present novel method comprises reacting in the presence of a hydrogen halide acceptor and of an inert liquid reaction medium a phosphoramide compound of the formula

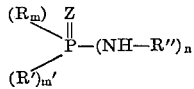

with a carboxylic acid halide of a carboxylic acid having a pK value of, numerically, less than 5.0, said acid halide being essentially inert in the presence of hydrogen halide acceptor, whereby an acyl moiety of the employed acid halide compound is introduced in place of hydrogen on at least one nitrogen atom in the phosphoramide compound. In the above and succeeding formulae, Z represents a member selected from the group consisting of oxygen and sulfur; in each of its $m$ occurrences, independently, R represents a member selected from the group consisting of phenyl, substituted phenyl, phenoxy, substituted phenoxy, alkyl, and alkoxy; R' represents a member selected from the group consisting of dialkylamino, N-loweralkyl-2,2,2-trihaloacetamido, and N-loweralkyl-2,2-dihaloloweralkanoylamido; R" represents a member selected from the group consisting of, wherein each R" is selected independently, hydrogen, alkyl, and alkenyl, and, wherein two R" moieties of the same phosphoramide molecule are taken together, dicarbonylene, a maximum of one R" radical representing hydrogen; $m$ is an integer of from 0 to 2, inclusive; $m'$ is an integer of from 0 to 1, inclusive; $n$ is an integer of from 1 to 3, inclusive; and the sum of $m$, $m'$, and $n$ is always 3.

In the present specification and claims, the terms "substituted phenyl" and "substituted phenoxy" are employed to designate phenyl and phenoxy, respectively, substituted with from 1 to 5, both inclusve, substituent groups each of which substituent groups is selected from those having Hammett constants of a value of less than +0.5 when in the meta or para position, and is inert to the reaction conditions of the present method. Representative suitable substituent groups are halo, loweralkoxycarbonyl, nitro, cyano, loweralkylcarbonyl, thiocyano, and carbamoyl.

As carboxylic acid halide there can be employed the acid halide of any carboxylic acid having a pK value of, numerically, less than 5.0 except that it is critical that the acid halide be essentially inert in the presence of hydrogen halide acceptor. Any acid halide reactant which does not have an α-hydrogen atom is inert under the reaction conditions of the present synthesis. Where the acid halide function is bonded directly to an aromatic structure, such as benzene or naphthalene, the aromatic character of the ring structure is such that there exists no α-hydrogen atom, i.e., no hydrogen atom attached to the carbon atom of the ring to which is also attached the acid halide function. Accordingly, aromatic compounds having one or more acid halide functions attached directly thereto can be employed in the method of the present invention.

Aliphatic carboxylic acids of which the corresponding acid halides can be employed in the reaction according to the present invention, inlude trichloroacetic acid, tribromoacetic acid, trifluoroacetic acid, dichlorofluoroacetic acid, difluorochloroacetic acid, bromodichloroacetic acid, 2,2-dibromopropionic acid, 2,2-dichloropropionic acid, perfluoropropionic acid, 2,2-dichlorobutyric acid, heptafluorobutyric acid, perfluorovaleric acid, 2,2-dimethylhexanoic acid, 2,2-diethylheptanoic acid, and the like. Representative aliphatic dicarboxylic acids, of which the acid halides can be employed in the present synthesis, include oxalic acid, diethylmalonic acid, dimethylmalonic acid, methylethylmalonic acid, and the like.

Representative aromatic monocarboxylic acids, of which the acid halides can be employed according to the present method, include benzoic acid; ortho, meta, and para-bromobenzoic acids; para-tertiary-butylbenzoic acid; para-ethylbenzoic acid; ortho, meta, and para-fluorobenzoic acids; ortho, meta, and para-iodobenzoic acids; ortho, meta, and para-methoxybenzoic acids; 2-methyl-6-nitrobenzoic acid; α-naphthoic acid; β-naphthoic acid; ortho, meta, and para-nitrobenzoic acids; para-phenoxybenzoic acid; 2,4-dichlorobenzoic acid; and 3,4,5-trimethylbenzoic acid. Aromatic dicarboxylic acids of which the acyl halides can be employed in the present invention include phthalic acid, 4-nitrophthalic acid, 4,5-dichlorophthalic acid, tetrachlorophthalic acid, and the like.

The acid halide, in all instances, contains at least one acid halide function; however, a mono-functional acid halide of a dibasic or polybasic acid can be employed wherein one or more acidic groups is "blocked", as, for example, by esterification of one of the acid halide functions or the like. Preferred acid halid compounds are halogenated benzoyl halides, phthaloyl halides, halogenated phthaloyl halides, nitrophthaloyl halides, oxalyl halides, halogenated malonyl and succinyl halides, trihaloacetyl halides, and 2,2-dihalo -unhalogenated or halogenated-loweralkanoyl halides. The terms "alkoxy," "alkyl," and "alkenyl" are employed in the present specification and claims to refer to radicals being of from 1 to 6, inclusive, carbon atoms, and the term "halogen" is employed to refer only to bromine, chlorine, or fluorine. As employed in the present specification and claims, the terms "loweralkyl" and "loweralkenyl" designate radicals being of from 1 to 4, inclusive, carbon atoms; and the term "dicarbonylene" is used to designate a radical of the formula

The term "halogenated benzoyl halide," as employtd in the present specification and claims, designates a benzoyl halide substituted by from 1 to 5, both inclusive, halogen atoms; and the term "halogenated phthaloyl halide" is employed in the present specification and claims to designate a phthaloyl halide substituted by from 1 to 4, both inclusive, halogen atoms.

The terms N-loweralkyl-2,2-dihalo-unhalogenated or halogenated loweralkanoyl and N-loweralkyl-2,2-dihalo-unhalogenated or halogenated-loweralkanoylamido as employed in the present specification and claims, are used to designate radicals of the formula

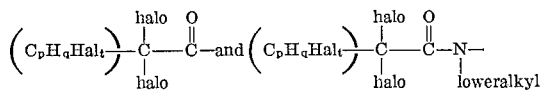

respectively, wherein $p$ is an integer of from 1 to 2, inclusive; each of $q$ and $t$ is an integer of from 0 to $(2p+1)$, both inclusive; and the sum of $q$ and $t$ always equals $(2p+1)$.

When the acid halide reactant is an acid halide of a monobasic acid, i.e., halogenated benzoyl halide, trihaloacetyl halide, 2,2-dihalo-unhalogenated or halogenated-alkanoyl halide, or a monofunctional acid halide of a dibasic or polybasic acid (such as ar-(alkoxycarbonyl) benzoyl halide), the present novel method of synthesis can be employed to introduce 1 or more acyl radicals, each of which is monovalent, and each of which is introduced onto a different nitrogen atom of the phosphoramide compound. Representative monovalent acyl radicals include halogenated benzoyl, ar-(alkoxycarbonyl)-benzoyl, trihaloacetyl, and 2,2-dihalo-unhalogenated or halogenated-alkanoyl. When $n$ represents, in the starting phosphoramide reactant, an integer greaater than 1, the product obtained by the introduction of only 1 monovalent acyl radical into the phosphoramide reactant can, itself, be reacted further in accordance with the present invention, with an acid halide of a dibasic or polybasic acid or with an acid halide of another monobasic acid.

When the acid halide employed in accordance with the present invention is an acid halide of a dibasic or polybasic acid, such as, for example, phthaloyl halide, halogenated phthaloyl halide, nitrophthaloyl halide, oxalyl halide, or halogenated malonyl halide, the present method of synthesis can be employed to introduce a divalent diacyl radical onto one or onto 2 nitrogen atoms of the phosphoramide compound. As understood by those skilled in the art, reactions which result in the formation of a 5 or 6 membered ring are favored. Accordingly, when oxalyl or halogenated malonyl halide is employed as acid halide reactant and $n$ represents 2 or 3, the reaction proceeds with the preparation of a cyclic product of the formula

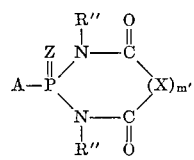

In the above and succeeding formulae, A represents a member selected from the group consisting of R, R',
monoloweralkylamino, and monoloweralkenylamino. The substituent X represents the group, $-C(hal)_2-$. When oxalyl or halogenated malonyl halide has been reacted with a phosphoramide compound in this manner, the cyclic product formed can be reacted further, in accordance with the present method of synthesis, with an acid halide of a monobasic acid to introduce onto such nitrogen which bears a hydrogen substituent a monovalent acyl radical.

When oxalyl or halogenated malonyl or succinyl halide is employed as acid halide reactant and $n$ represents only 1, the reaction proceeds readily to prepare a bis product of the formula

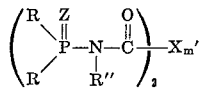

In further accordance with the preference for formation of 5 or 6 membered rings, the employment of phthaloyl or any substituted phthaloyl halide results, when R" represents hydrogen and $n$ equals 1, in the preparation of dicarboximidophosphonate product of the formula

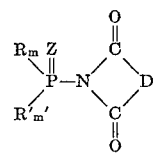

wherein D represents ortho-phenylene or substituted ortho-phenylene, and the sum of $m$ and $m'$ is 2.

Other embodiments of the present novel method of synthesis will become evident in view of the following specification and claims.

The preferred embodiments of the present invention comprise novel compounds and methods for making the novel compounds. These compounds are of one of the formulae

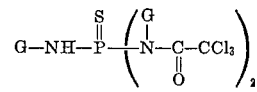

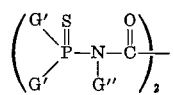

and

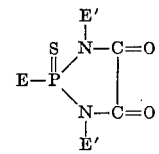

In each compound represented by a formula in the present specification and claims, each moiety represented by G is the same loweralkyl radical; each moiety represented by G' is independently selected from the group consisting of loweralkoxy, phenoxy, and phenyl; each moiety represented by G" is independently selected from the group consisting of hydrogen and loweralkyl; E represents a member selected from the group consisting of loweralkyl, phenyl, loweralkoxy, phenoxy, monoloweralkylamino, diloweralkylamino, monoloweralkenylamino, and N-loweralkyl-2,2,2-trihaloacetamido; and each moiety represented by E' is independently selected from the group consisting of loweralkyl and loweralkenyl. These products are crystalline solid products or oils, somewhat soluble in many organic solvents and of low solubility in water. They are useful as parasiticides and herbicides and are adapted to be employed for the control of a number of plant, mite, helminth, insect, bacterial, and fungal organisms, such as aphids, beetles, ticks, worms, screwworms, coontail, and millet. The compounds are particularly effective for the control of insect and acarid organisms, such as, for example, 2-spotted spider mite, southern army worm, Mexican bean beetle, housefly, confused flour beetle, and the like.

The reaction of phosphoramide compound and acid halide reactant in the presence of a hydrogen halide acceptor is carried out in an inert reaction medium, preferably an inert organic liquid. Hydrocarbons and ethers boiling below 150° C. at one atmosphere are classes of suitable organic liquids. Representative appropriate organic liquids are benzene, hexane, toluene, ethylbenzene, diethyl ether, isopropyl methyl ether, and ethyl methyl ether.

The hydrogen halide acceptor can be any of those commonly employed in organic synthesis, such as a tertiary organic base or an alkali metal hydride or alkali base. Preferred hydrogen halide acceptors include pyridine, triethylamine, and sodium hydride.

The reaction takes place at temperatures from −30° C. to 100° C. and preferably, at tempeartures of −20° C. to 30° C. with the production of the desired product compound and of halide of reaction. This halide appears in the reaction mixture as tertiary organic base hydrohalide or an alkali metal halide. The method of the present invention takes place under pressures of a wide range, for example, at subatmospheric pressures or at superatmospheric pressures such as 1 to 20 or more atmospheres. Generally, no advantages result from the use of subatmospheric or of superatmospheric pressure, the method is therefore conveniently and preferably practiced at atmospheric pressure.

The amounts of the reactants and of hydrogen halide acceptor employed are not critical, some of the desired product being produced when employing the reactants in any amounts. However, the use of the reactants and hydrogen halide acceptor in amounts which represent those consumed in the reaction is preferred.

When an acid halide of a monobasic acid or a monofunctional acid halide of a polybasic acid is employed, the reaction consumes one molecular proportion of phosphoramide compound and a number of molecular proportions of each of the acid halide and hydrogen halide acceptor equivalent to the number of monovalent monoacyl radicals to be introduced into the phosphoramide compound.

When dihalide of a polybasic acid is employed and the divalent diacyl group introduced onto a nitrogen atom of only one molecule of phosphoramide compound, equimolecular proportions of phosphoramide compound, acid halide reactant, and hydrogen halide acceptor are consumed. When such acid dihalide reactant is introduced into two molecules of phosphoramide compound, one molecular proportion of acid halide reactant and two molecular proportions of each of the phosphoramide compound and of hydrogen halide acceptor are consumed.

In carrying out the reaction, the reactants are mixed and contacted together in any convenient fashion in the presence of the hydrogen halide acceptor, and the resulting mixture maintained for a period of time in the reaction temperature range to complete the reaction. Following the completion of the reaction, the unmodified reaction mixture can be employed for the useful purposes of the present invention or the halide of reaction can be removed by washing with water or by filtration. Additionally, any organic reaction medium can be removed by fractional distillation or evaporation under subatmospheric pressure to obtain the desired product as a residue. This product residue can be employed without purification or can be further purified by conventional procedures, such as, for example, washing with water and dilute aqueous alkali metal hydroxide, solvent extraction, and recrystallization.

Preparations of mixed imide compounds in the best manner now known of the present invention are illustrated by the following procedures.

EXAMPLE 1.—PREPARATION OF N-(DIETHOXYPHOSPHINYL)-2,2,2-TRICHLOROACETAMIDE

Trichloroacetyl chloride (91 grams; 0.5 mole) was added to 500 milliliters of benzene. The resulting first solution was added over a period of 5 hours portion-wise and with stirring to a second mixture consisting of diethyl phosphoramidate (77 grams; 0.5 mole) and triethylamine (56 grams; 0.55 mole) in 500 milliliters of benzene. The resulting reaction mixture was held for 10 hours in the reaction temperature range, with stirring, and then filtered. The filtrate was thereafter washed with water and the reaction medium removed from the filtrate by evaporation under subatmospheric pressure, to obtain the N - (diethoxyphosphinyl) - 2,2,2-trichloroacetamide product as a residue. The residue, a solid, was dispersed in cyclohexane at a temperature of about 80° C.; the resulting mixture was filtered and the cyclohexane removed from the filtrate by evaporation under subatmospheric pressure. The product, crystallized from ligroin, melted at 48–48.5° C.

EXAMPLE 2.—PREPARATION OF N-((ISOPROPYLAMINO)PHENOXYPHOSPHINOTHIOYL) - N-ISOPROPYL-2,2,2-TRICHLOROACETAMIDE

In procedures essentially the same as those of Example 1, except that the phosphoramide compound employed was O-phenyl N,N'-diisopropylphosphorodiamidothioate, there is obtained an N-((isopropylamino)phenoxyphosphinothioyl)-N-isopropyl-2,2,2 - trichloroacetamide product. The product from a preparation representative of the present example was found to be an oil of very low solubility in water and of low to moderate solubility in acetone and benzene. The product has a molecular weight of 417.7.

EXAMPLE 3.—PREPARATION OF N-(DIPHENOXYPHOSPHINOTHIOYL)-PHTHALIMIDE

Phthaloyl chloride (20.3 grams; 0.1 mole) was mixed with 200 milliliters of benzene. The resulting solution was added over a period of 2 hours at room temperature and with stirring to a second solution of O,O-diphenyl phosphoramidothioate (26.5 grams; 0.1 mole) and triethylamine (21.2 grams; 0.21 mole) in 400 milliliters of benzene. The resulting reaction mixture was agitated for 60 hours at room temperature; thereafter, the reaction mixture was heated for 15 hours at a temperature of about 80° C. The heated reaction mixture was then filtered, and the benzene removed from the filtrate by evaporation under subatmospheric pressure to yield the N-(diphenoxyphosphinothioyl)phthalimide product as a residue. The residue, a tan solid, was dispersed in carbon tetrachloride, the resulting solution filtered, and carbon tetrachloride removed from the filtrate by evaporation under subatmospheric pressure. The product was recrystallized from ligroin (boiling at 60–70° C.) and melts at 70–72° C.

EXAMPLE 4.—PREPARATION OF N-(DIETHOXYPHOSPHINOTHIOYL)-3-NITROPHTHALIMIDE

In procedures essentially the same as those of Example 3, employing, as phosphoramide compound, O,O-diethyl phosphoramidothioate, and, as acid halide reactant, 3-nitrophthaloyl chloride, there is obtained an N-(diethoxyphosphinothioyl)-3-nitrophthalimide compound as a solid product melting at 91–92° C.

EXAMPLE 5.—PREPARATION OF N-(BIS(ETHYLAMINO)PHOSPHINOTHIOYL) - N - ETHYL-2,2,2-TRICHLOROACETAMIDE

In procedures essentially the same as those of the foregoing examples, employing trichloroacetyl chloride and N, N',N''-triethylphosphorotriamidothioate, there is obtained an N - (bis(ethylamino)phosphinothioyl)-N-ethyl-2,2,2-trichloroacetamide product having the density, $d_4^{25}$ 1.3231.

EXAMPLE 6.— PREPARATION OF 2-(N-ETHYL-2,2,2-TRICHLOROACETAMIDO) - 1,3 - DIETHYL-2 - THIONO - 1,3,2 - DIAZAPHOSPHOLIDINE-4,5-DIONE

The N - (bis(ethylamino)phosphinothioyl) - N - ethyl-2,2,2 - trichloroacetamide product (68.1 grams; 0.2 mole) and triethylamine (45.0 grams; 0.45 mole) were mixed in 200 milliliters of benzene. To the resulting mixture was added a second solution of oxalyl chloride (25.0 grams; 0.2 mole) in 100 milliliters of benzene. The addition was carried out portionwise over a period of about 6 hours, with stirring, and at room temperature. Thereafter, the reaction mixture was agitated for 70 hours at the same temperature, filtered, and the benzene removed from the filtrate by evaporation under subatmospheric pressure to obtain 2 - (N - ethyl - 2,2,2 - trichloroacetamido) - 1,3-diethyl - 2 - thiono - 1,3,2 - diazapholidine - 4,5 - dione product as a residue. The product residue was thereafter mixed with 2 liters of cyclohexane at a temperature range of from 60° to 70° C., and the diluent removed from the mixture by evaporation under subatmospheric pressure to obtain a purified product residue. The purified product residue was extracted with ether and the diluent evaporated from the extract. Crystallization from ligroin (60/70) gave a pure product, melting at 111–112° C.

The product of the present example is also prepared by reacting together N,N',N" - triethylphosphorotriamidothioate and oxalyl chloride in the presence of hydrogen halide acceptor to give a 2 - (ethylamino) - 1,3 - diethyl - 2 - thiono - 1,3,2 - diazapholidine - 4,5 - dione product (melting at 69–70° C.) and reacting this together with trichloroacetyl chloride in the presence of hydrogen halide acceptor and inert liquid reaction mixture.

EXAMPLE 7.—PREPARATION OF 2 - ETHOXY - 1,3-DIMETHYL - 2 - THIONO - 1,3,2 - DIAZAPHOSPHOLIDINE-4,5-DIONE

A first mixture of oxalyl chloride (25.4 grams; 0.2 mole) in 100 milliliters of benzene was prepared. This first solution was added portionwise over a period of 12 hours and with stirring to a second mixture of O-ethyl N,N' - dimethylphosphorodiamidothioate (33.6 grams; 0.2 mole) and triethylamine (45 grams; 0.4 mole) in 200 milliliters of benzene. The addition was carried out at room temperature of about 25°–28° C. Thereafter, the resulting mixture was agitated for about 100 hours at room temperature. Then the reaction mixture was filtered, the inert reaction medium removed from the filtrate by evaporation under subatmospheric pressure, and the 2-ethoxy - 1,3 - dimethyl - 2 - thiono - 1,3,2 - diazaphospholidine - 4,5 - dione product obtained as a residue. The product residue was mixed with cyclohexane and the cychohexane removed from the mixture by evaporation under subatmospheric pressure to obtain a purified product residue. This purified residue was filtered to obtain the product as the solid component thereof. The product was thereafter recrystallized from ligroin (boiling at 60°–70° C.) and found to melt at 90°–91°C.

In view of the detailed statements of the best methods now known, as hereinbefore set forth, and with the guidance of the foregoing comments on selection of reactants, skilled chemists can readily prepare desired other products according to the present process.

The following examples are representative of starting materials thus selected, and their reaction products.

Employing phthaloyl chloride, O,O - diethyl phosphoramidothioate, and pyridine as hydrogen halide acceptor, a crystalline N - (diethoxyphosphinothioyl)phthalimide product melting at 85–86° C.

From O - methyl N,N' - diisopropylphosphorodiamidothioate and oxalyl chloride, 2 - methoxy - 1,3 - diisopropyl - 2 - thiono - 1,3,2 - diazaphospholidine - 4,5 - dione product having a molecular weight of 264.3.

From O,O - diphenyl phosphoramidothioate and trichloroacetyl chloride, N - (diphenoxyphosphinothioyl) - 2,2,2 - trichloroacetamide product having the density $d_4^{25}$ 1.4801.

From O,O - diethyl phosphoramidate and phthaloyl chloride, a crystalline N - (diethoxyphosphinyl)phthalimide product melting at 65° C.

From N,N',N" - tri - n - propylphosphorotriamidothioate and trichloroacetyl chloride, N,N',N" - tri - n - propyl-N,N' - bis(trichloroacetyl)phosphorotriamidothioate product having a molecular weight of 528.1.

From O - ethyl N,N - dimethylphosphorodiamidothioate and tetrachlorophthaloyl chloride, a crystalline N - ((dimethylamino)ethoxyphosphinothioyl) - 3,4,5,6-tetrachlorophthalimide product melting at 170° C.

From O,O - diphenyl n - butylphosphoramidothioate and oxalyl chloride, N,N' - bis(diphenoxyphosphinothioyl) - N,N' - di - n - butyloxamide product having a molecular weight of 696.8.

From P,P-diphenylphosphinothioic amide and phthaloyl chloride, a white crystalline solid N - (diphenylphosphinothioyl)phthalimide product melting at 197–198° C.

From O - ethyl N,N - dimethylphosphorodiamidothioate and phthaloyl chloride, a white crystalline solid N - ((dimethylamino) ethoxyphosphinothioyl) phthalimide product melting at 83–84° C.

From O,O - diethyl phosphoramidothioate and oxalyl chloride, a N,N' - bis(diethoxyphosphinothioyl)oxamide product having a refractive index $n_D^{25}$ 1.5039.

From O - n - propyl - N,N' - di - n - butylphosphorodiamidothioate and oxalyl chloride, 2 - n - propoxy - 1,3 - di - n - butyl - 2 - thiono - 1,3,2 - diazapholidine - 4,5-dione product having a molecular weight of 320.4.

From P,P - diphenylphosphinothioic and tetrachlorophthaloyl chloride, a crystalline solid N - (diphenylphosphinothioyl) - 3,4,5,6 - tetrachlorophthalimide product melting at 198–200° C.

From O,O - diethyl phosphoramidothioate and trichloroacetyl chloride, N - (diethoxyphosphinothioyl) - 2,2,2 - trichloroacetamide product as an oil having the refractive index $n_D^{25}$ 1.5000.

From N,N',N" - tri - n - propyl - N - (trichloroacetyl) - phosphorotriamidothioate and oxalyl chloride, 2 - (N - n - propyl - 2,2,2 - trichloroacetamido) - 1,3 - di - n - propyl-2 - thiono - 1,3,2 - diazapholidine - 4,5 - dione product having a molecular weight of 436.8.

From P,P - diphenylphosphinothioic amide and trichloroacetyl chloride, a white crystalline solid N - (diphenylphosphinothioyl) - 2,2,2 - trichloroacetamide product melting at 170° C.

From N,N',N" - triisopropylphosphorotriamidothioate and trichloroacetyl chloride, N,N',N" - triisopropyl - N,N' - bis(trichloroacetyl)phosphorothioic triamide product having a molecular weight of 528.1.

From O,O - diethyl phosphoramidothioate and tetrachlorophthaloyl chloride, a white crystalline solid N - (diethoxyphosphinothioyl) - 3,4,5,6 - tetrachlorophthalimide product melting at 162–165° C.

From O,O-di-n-butyl-phosphoramidothioate and oxalyl chloride, an N,N' - bis(di-n-butoxyphosphinylthioyl)oxamide product having a molecular weight of 504.6.

From dioctyl phosphoramidate and phthaloyl chloride, N-(dioctyloxyphosphinyl)phthalamide product having the density, $d_4^{25}$ 1.0985.

From N,N',N" - triethylphosphorotriamidothioate and 2,2-dichloropropionyl chloride, a white crystalline solid N-(bis(ethylamino)phosphinothioyl) - N - ethyl-2,2-dichloropropionamide product melting at 44.5–45.5° C.

From P,P-diphenylphosphinothioic amide and oxalyl chloride, N,N' - bis(diphenylphosphinothioyl)oxamide product having a molecular weight of 520.6.

From diethyl phosphoramidate and oxalyl chloride, N,N'-bis(diethoxyphosphinyl)oxamide product having the refractive index, $n_D^{25}$ 1.4476.

From P,P-diphenyl-N-isopropylphosphinothioic amide and oxalyl chloride, N,N'-bis(diphenylphosphinothioyl)-N,N'-diisopropyloxamide product having a molecular weight of 604.7.

From N,N',N''-triethylphosphorotriamidothioate and trichloroacetyl chloride, a crystalline solid N,N',N''-triethyl-N,N'-bis(trichloroacetyl)phosphorothioic triamide product melting at 125–126° C.

From O-isobutyl N,N'-dimethylphosphorodiamidothioate and oxalyl chloride, 2-isobutyl-1,3-dimethyl-2-thiono-1,3,2-diazaphospholidine-4,5-dione product having a molecular weight of 250.3.

From O-ethyl N,N'-dimethylphosphorodiamidothioate and trichloroacetyl chloride, an O-ethyl N,N'-dimethyl N-trichloroacetylphosphorodiamidothioate product. The product is an oil having the refractive index, $n_D^{25}$ 1.5310.

From N,N',N''-triallylphosphorotriamidothioate and oxalyl chloride, 2-(allylamino)-1,3-diallyl-2-thiono-1,3,2-diazaphospholidine-4,5-dione product having a molecular weight of 271.3.

From O,O-diphenyl phosphoramidothioate and tetrachlorophthaloyl chloride, a crystalline solid N-(diphenoxyphosphinothioyl)-3,4,5,6-tetrachlorophthalimide product melting at 186–188° C.

From O,O-dimethyl phosphoramidothioate and oxalyl chloride, N,N'-bis(dimethoxyphosphinothioyl)oxamide product having a molecular weight of 336.3.

From O-phenyl methylphosphorodiamidothioate and trichloroacetyl chloride, N-((methylamino)phenoxyphosphinothioyl)-2,2,2-trichloroacetamide product. The product is an oil of very low solubility in water and of low to moderate solubility in acetone and benzene; the molecular weight is 347.6.

From O-phenyl N,N'-dimethylphosphorodiamidothioate and trichloroacetyl chloride, N-((methylamino)phenoxyphosphinothioyl)-N-methyl-2,2,2-trichloroacetamide product having the refractive index, $n_D^{25}$ 1.5710.

From N,N',N''-tri-n-butylphosphorotriamidothioate and trichloroacetyl chloride, N,N',N''-tri-n-butyl-N,N'-bis(trichloroacetyl)phosphorotriamidothioate product having a molecular weight of 570.2.

From N,N',N''-trimethylphosphorothioic triamide and trichloroacetyl chloride, crystalline solid N,N',N''-trimethyl-N,N'-bis(trichloroacetyl)phosphorotriamidothioate product melting at 144–145° C.

From N,N'-dimethyl-P-ethylphosphonodiamidothioate and oxalyl chloride, 2-ethyl-1,3-dimethyl-2-thiono-1,3,2-diazaphospholidine-4,5-dione product having a molecular weight of 206.2.

From O,O-diethyl phosphoramidate and tetrachlorophthaloyl chloride, N-(diethoxyphosphino)-3,4,5,6-tetrachlorophthalimide product as a white crystalline solid melting at 144–145° C.

From N-ethyl-N'-methyl-P-phenylphosphonodiamidothioate and oxalyl chloride, 2-phenyl-1-ethyl-3-methyl-2-thiono-1,3,2-diazaphospholidine-4,5-dione product having a molecular weight of 268.3.

From O-(2,4-dichlorophenyl) isopropylphosphorodiamidothioate and phthaloyl chloride, a crystalline solid N-((2,4-dichlorophenoxy)(isopropylamino)phosphinothioyl)phthalimide product melting at 139–139.5° C.

From O-phenyl N,N'-diethylphosphorodiamidothioate and trichloroacetyl chloride, N-((ethylamino)phenoxyphosphinothioyl)-N-ethyl-2,2,2-trichloroacetamide product. The product is an oil of a molecular weight of 389.7.

From N-(bis(ethylamino)phosphinothioyl)-N-ethyl-2,2,2-trichloroacetamide and trichloroacetyl chloride, a crystalline solid N,N',N''-triethyl-N,N'-bis(trichloroacetyl)phosphorothioic triamide product melting at 125–126° C.

From N,N',N''-triethylphosphorothioic triamide and p-chlorobenzoyl chloride, and N-(bis(ethylamino)phosphinothioyl)-N-ethyl-p-chlorobenzamide product. The product is a tan oil having a density of $d_4^{25}$ 1.1919.

From O-phenyl N,N'-diisobutylphosphorodiamidothioate and oxalyl chloride, 2-phenoxy-1,3-diisobutyl-2-thiono-1,3,2-diazaphospholidine-4,5-dione product having a molecular weight of 354.4.

From N,N',N''-trimethylphosphorothioic triamide and trichloroacetyl chloride, an N-(bis(methylamino)phosphinothioyl)-N-methyl-2,2,2-trichloroacetamide product having a refractive index, $n_D^{25}$ 1.5631.

From O,O-diphenyl methylphosphoramidothioate and oxalyl chloride, N,N'-bis(diphenoxyphosphinothioyl)-N,N'-dimethyloxamide product having a molecular weight of 612.7.

From O-phenyl N,N'-diallylphosphorodiamidothioate and oxalyl chloride, a white crystalline 2-phenoxy-1,3-diallyl-2-thiono,-1,3,2-diazaphospholidine-4,5-dione product having a melting point of 74° C.

From N-methyl-N-isobutyl-N'N''-bis(2-butenyl)phosphorotrithioate and oxalyl chloride, 2-(isobutylmethylamino)-1,3-bis,2-butenyl)-2-thiono-1,3,2-diazaphospholidine-4,5-dione product having a molecular weight of 343.4.

When the compound product of the present invention is employed as a parasiticide and herbicide, the unmodified product can be used. However, the compound product can be modified by the addition thereto of one or more additaments. For example, compound can be dispersed on a finely divided solid such as chalk or talc or a finely divided solid surface active dispersing agent and the resulting mixture employed as dust. Such mixture can be dispersed in water and employed as a spray. In other procedures the product can be employed as active constituents in solvent solutions, water-in-oil or oil-in-water emulsion or aqueous dispersion.

In representative operations, N,N'-bis(diethoxyphosphinothioyl)oxamide is employed for the control of *Tetranychus bimaculatus*. In such operations, a stand of cranberry bean plants heavily infested with *Tetranychus bimaculatus* was wetted briefly with a composition containing 500 parts of the compound as sole toxicant per million parts by weight of ultimate treating mixture. A similar stand of cranberry bean plants heavily infested with *Tetranychus bimaculatus* was left untreated. Thereafter, the treated and untreated stands were held under conditions favorable to the growth of *Tetranychus bimaculatus*, and, about three days following the treatment, examined to determine the percent mortality of *Tetranychus bimaculatus*. It was found that in the untreated stand, there continued to be a heavy infestation of *Tetranychus bimaculatus* while in the treated group, calculated according to Abbott's formula, there was an essentially complete kill and control of *Tetranychus bimaculatus*.

The phosphoramide compounds to be employed as reactants according to the method of the present invention, wherein $m'=1$ and R' represents N-loweralkyl-2,2,2-trihaloacetamido or N-loweralkyl-2,2-dihaloloweralkanoylamido or wherein $n=2$ and two R'' moieties, taken together, represent dicarbonylene, are themselves prepared by the method of the present invention. All of the remaining phosphoramide compounds are prepared in known procedures. Thus, those compounds of the following formula

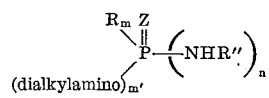

wherein R, when present, represents phenoxy, substituted phenoxy, or alkoxy, and each R'' represents hydrogen, alkyl or alkenyl are prepared by employing a phosphoryl compound of the formula $Cl_3\!-\!P\!=\!Z$. In such procedures the phosphoryl compound is reacted successively in either order or simultaneously with one or more compounds selected from those of the formulae R—alkali metal, (dialkylamino)H, and NH₂R″ to prepare the desired phosphoramide product. Good results are obtained when employing one molecular proportion of phosphoryl compound and a number of proportions of each other reactant equal to the number of times the group derived from such reactant is to be present in the phosphoramide compound, i.e., the value of $m$ in the instance of the R—alkali metal reactant, the value of $m'$ in the instance of the (dialkylamino)H reactant, and the value of $n$ is the instance of the NH₂R″ reactant.

Those phosphoramide compounds of the formula

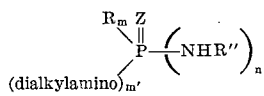

wherein $m=1$ or 2 and at least one R represents alkyl, phenyl, or substituted phenyl, are prepared by reacting a phosphorochloridate compound of the formula

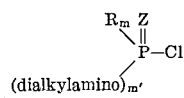

with a compound of the formula NH₂R″, to prepare the desired starting phosphoramide compound. Good results are obtained, when the sum of $m$ and $m'=2$, when employing equimolecular proportions of phosphorochloridate compound and NH₂R″ compound. When the sum of $m$ and $m'=1$, good results are obtained when employing one molecular proportion of phosphorochloridate compound and two molecular proportions of NH₂R″ reactant. The reaction is carried out in the presence of an acid binding agent and conveniently in the presence of an inert organic liquid as reaction medium.

The phosphorochloridate compound wherein $m=2$ and each R represents alkyl are prepared by reacting an alkylmagnesium bromide of the formula alkyl-Mg-Br with phosphorothioic trichloride of the formula

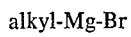

conveniently in an inert organic liquid as reaction medium and at temperatures between 5 and 25° C., to prepare an intermediate of the formula

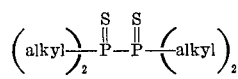

The intermediate is thereafter reacted with chlorine, conveniently at room temperature, and in the presence of inert reaction medium such as carbon tetrachloride, to prepare the desired phosphorochloridate product of the formula

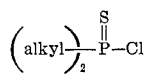

When it is desired to prepare phosphorochloridate of the formula

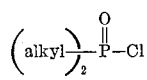

the corresponding product which is identical except that the double-bonded chalkogen is sulfur, or the intermediate employed in the preparation of such corresponding product, is reacted with sulfuryl chloride (SO₂Cl₂) at temperatures of about 30-35° C. in inert liquid reaction medium, such as benzene. After the reaction has been completed, the reaction mixture is filtered to remove sulfur by-product, and the filtrate fractionated to remove SOCl₂ by-product and to obtain phosphorochloridate product of the formula

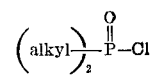

In similar manner are prepared the phosphorochloridate products wherein $m=2$, one of the R symbols represents alkyl, and the other R symbol represents phenyl or substituted phenyl. Thus, compound of the formula

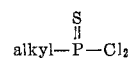

is reacted with an aryl magnesium compound of the formula

Ar-Mg-Br wherein Ar represents phenyl or substituted phenyl, to prepare intermediate of the formula

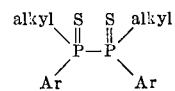

The intermediate is treated with chlorine in inert reaction medium such as carbon tetrachloride to obtain the desired phosphorochloridate product of the formula

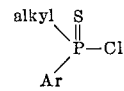

This product can be treated with sulfuryl chloride in the procedures hereinbefore discussed to prepare the corresponding P=O compound.

In the preparation of phosphorochloridate products wherein $m=2$, and each R represents phenyl or substituted phenyl, an aromatic compound of the formula Ar-H where Ar represents phenyl or substituted phenyl, is reacted with aluminum chloride and phosphorus trichloride (PCl₃) at temperatures of from 50° to 280° to prepare a di-arylphosphorus chloride product of the formula Ar₂PCl and PCl₃ by-product. Good results are obtained when employing the reactants in amounts which represent one molecular proportion of aromatic compound, 1.3 molecular proportions of aluminum chloride, and 4 molecular proportions of phosphorus trichloride. The PCl₃ is separated in conventional procedures and the diarylphosphorus chloride reacted with an excess of oxygen or PSCl₃ at temperatures of from 50 to 150° C. to prepare the desired phosphorochloride product of the formula

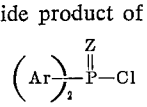

Phosphorochloridate products wherein one R moiety represents alkyl, phenyl, or substituted phenyl, and another R moiety represents alkoxy, phenoxy, or substituted phenoxy, and phosphorochloridate products wherein R represents alkyl, phenyl, or substituted phenyl, and R' represents dialkylamino, are prepared by reacting a hydrocarbylphosphorus dichloride product of the formula

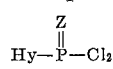

where the symbol "Hy" represents alkyl, phenyl, or substituted phenyl, with a compound of the formula

R‴H where R‴ represents alkoxy, phenoxy, substituted phenoxy, or dialkylamino. The reaction is carried out in the presence of an inert liquid reaction medium, and in the presence of a hydrogen chloride acceptor, such as an organic tertiary amine. Good results are obtained when employing equimolecular proportions of hydrocarbylphosphorus dichloride product, R'''H compound, and hydrogen halide acceptor.

All raw materials required in the preparation of the phosphoramide reactant to be employed in the method of the present invention, which raw materials have the formulae

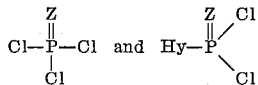

are conveniently available or can be manufactured as described by J. R. Van Wazer in "Phosphorus and its Compounds," volume I, pages 245 and 258 (1958, Interscience Publishers, New York, N.Y.), and by K. Sasse in "Methoden der Organischen Chemie," volume XII—Part I, "Organische Phosphorverbindungen," pages 387–406, 552–557 (1963; Thieme Verlag, Stuttgart, Germany).

I claim:

1. Compound selected from those of the formulae

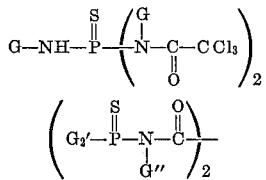

and

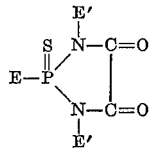

wherein such compound, each moiety represented by G is the same loweralkyl radical; each moiety represented by G' is independently selected from the group consisting of loweralkoxy, phenoxy, and phenyl; each moiety represented by G'' is independently selected from the group consisting of hydrogen and loweralkyl; E represents a member selected from the group consisting of loweralkyl, phenyl, loweralkoxy, phenoxy, monoloweralkylamino, diloweralkylamino, monoloweralkenylamino, and N-loweralkyl-2,2,2-trihaloacetamido; and each moiety represented by E' is independently selected from the group consisting of loweralkyl and loweralkenyl.

2. 2 - ethoxy - 1,3 - dimethyl-2-thiono-1,3,2-diazaphospholidine-4,5- dione.

3. 2 - phenoxy - 1,3 - diallyl - 2-thiono-1,3,2-diazaphospholidine-4,5- dione.

4. 2 - (N - ethyl - 2,2,2-trichloroacetamido)-1,3-diethyl-2-thiono-1,3,2-diazaphospholidine-4,5-dione.

5. N,N'-bis(diethoxyphosphinothioyl)oxamide.

6. N,N',N'' - triethyl - N,N' - bis(trichloroacetyl)phosphorothioic triamide.

References Cited

FOREIGN PATENTS 1,067,433  10/1959  Germany.

CHARLES B. PARKER, *Primary Examiner.*

ANTON H. SUTTO, *Assistant Examiner.*